United States Patent [19]
Valpredo

[11] Patent Number: 5,636,468
[45] Date of Patent: Jun. 10, 1997

[54] FISH LIPPING DEVICE

[76] Inventor: Jon S. Valpredo, 3513 Saddle Dr., Bakersfield, Calif. 93311

[21] Appl. No.: 258,689

[22] Filed: Jun. 13, 1994

[51] Int. Cl.⁶ ................................................ A01K 97/00
[52] U.S. Cl. .................................................... 43/53.5
[58] Field of Search ........................ 43/53, 5, 54.1, 43/21.2, 41; 294/99.2; 433/93

[56] References Cited

U.S. PATENT DOCUMENTS

| | | | |
|---|---|---|---|
| 1,208,671 | 12/1916 | Severtsen et al. | 43/53.5 |
| 2,653,048 | 9/1953 | Novak | 43/4 X |
| 4,019,255 | 4/1977 | Cohen et al. | 433/93 |
| 4,986,586 | 1/1991 | Eilrich et al. | 294/99.2 |

FOREIGN PATENT DOCUMENTS 30554  4/1911  Sweden ...................... 43/34

*Primary Examiner*—Joseph J. Hail, III
*Assistant Examiner*—Jay A. Stelacone
*Attorney, Agent, or Firm*—Robert M. Sperry

[57] ABSTRACT

An improved fish handling device comprising a generally U-shaped member having generally parallel upper and lower arms resiliently joined at one end and having a cushioning element carried by the free ends of the arms, with the free ends inclining downward at a predetermined angle to the axis of the arms and having barrier carried by the free ends adjacent their junction with the arms.

7 Claims, 3 Drawing Sheets

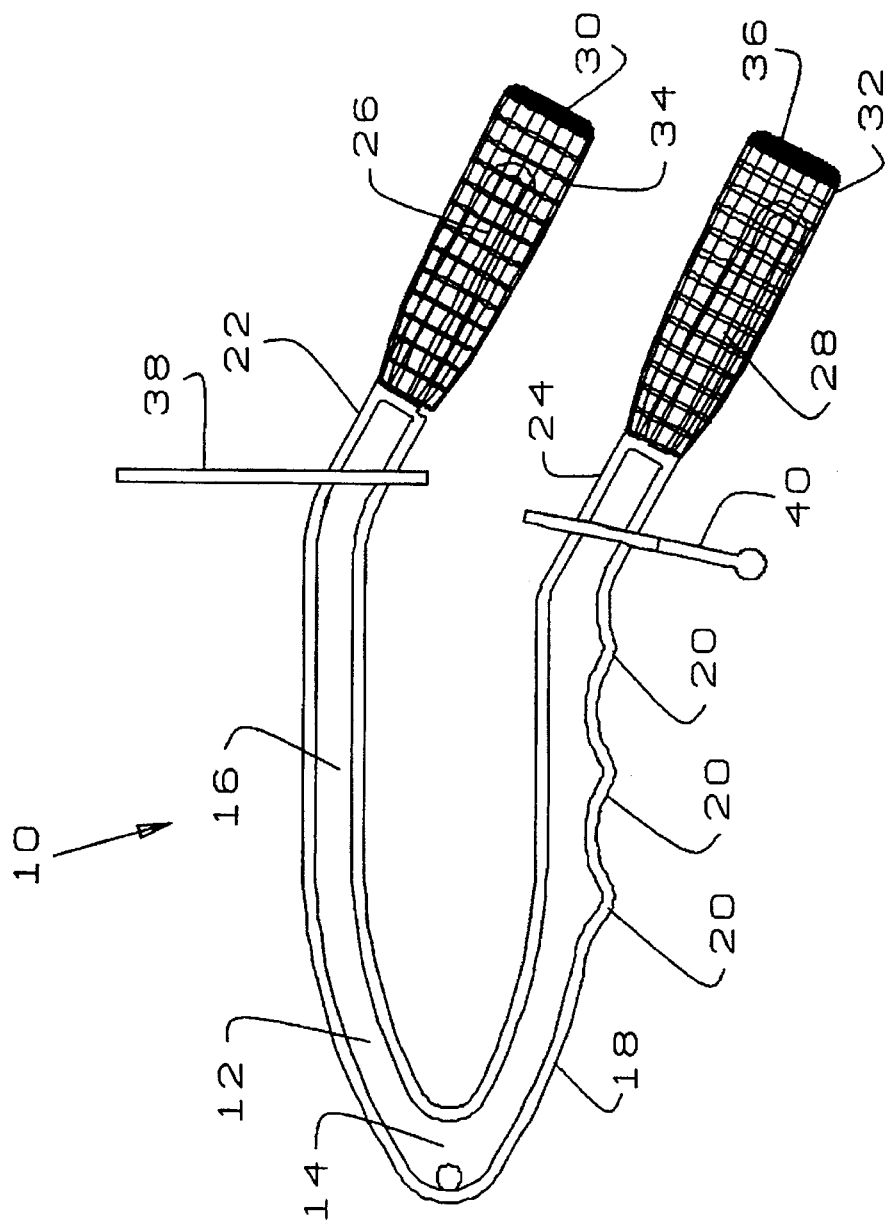

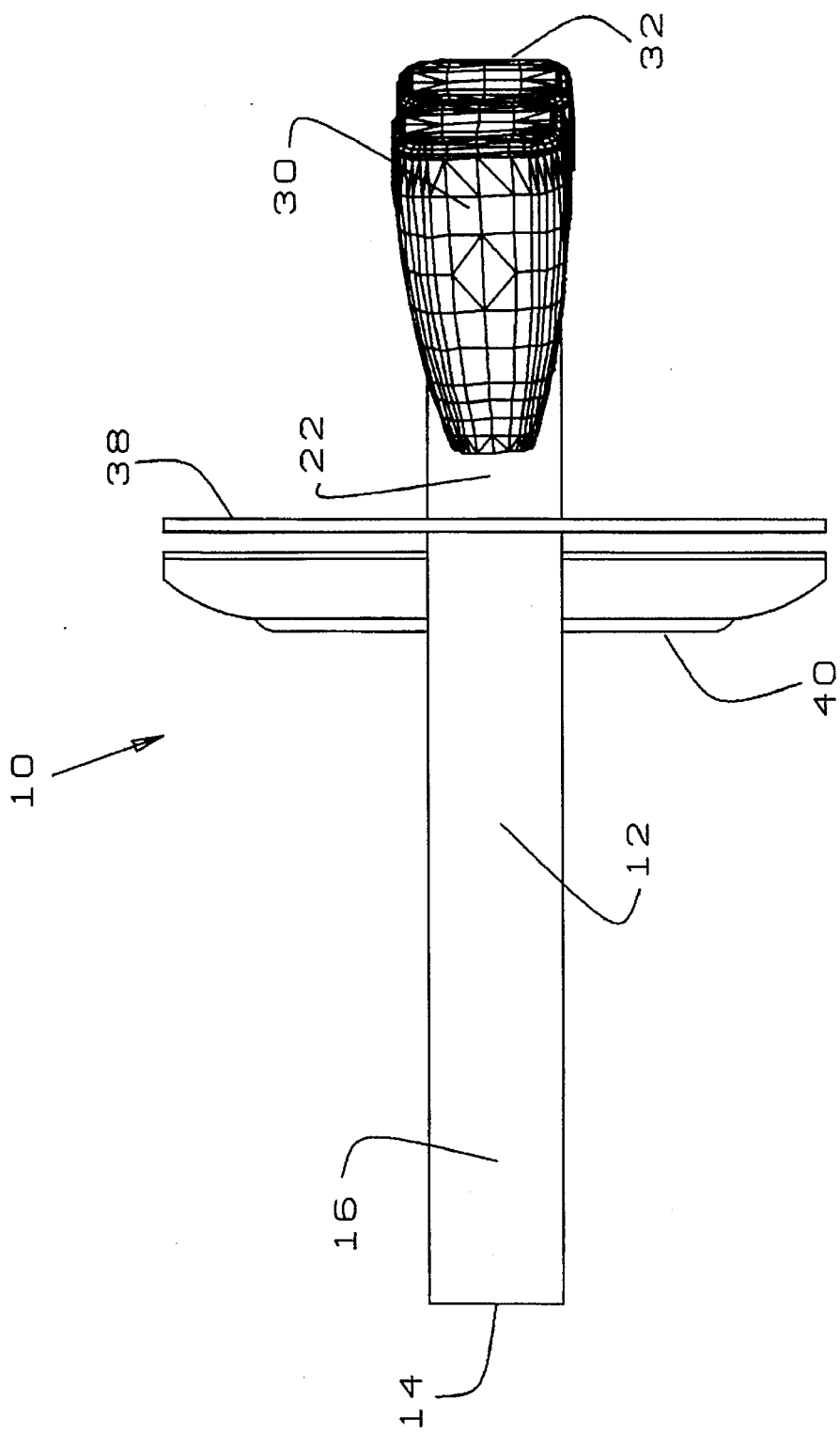

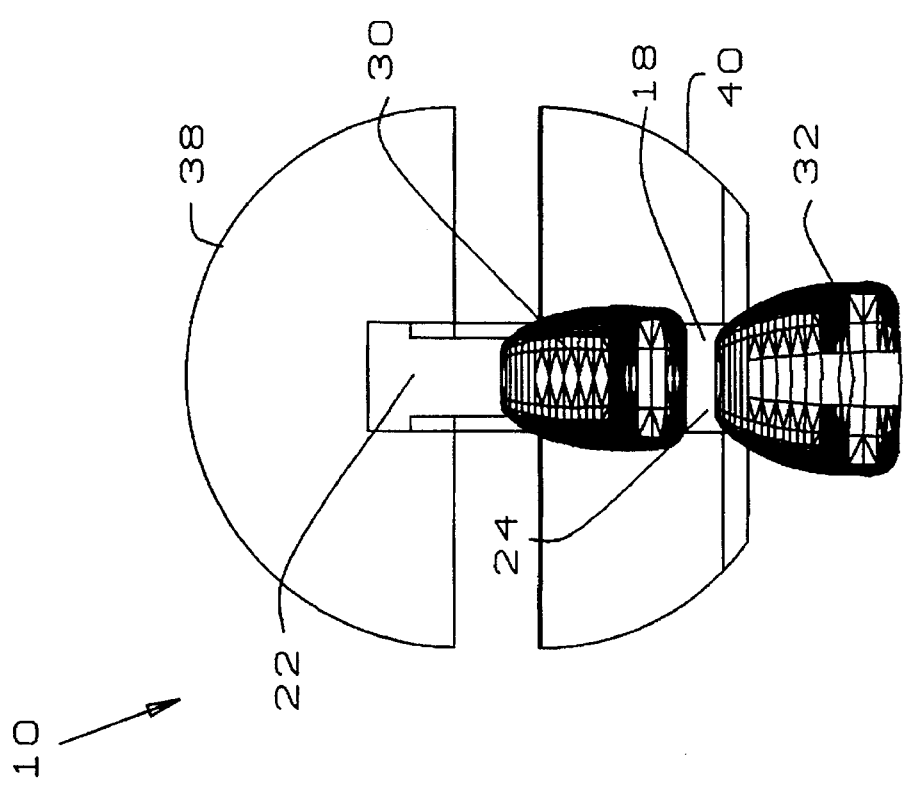

FISH LIPPING DEVICE

BACKGROUND

1. Field of Invention

This invention relates to sport fishing equipment and is particularly directed to improved means for lifting a fish from the water for hook removal and the like.

2. Prior Art

In sport fishing, once a fish is caught, it is necessary to lift the fish out of the water in order to remove the hook. Moreover, in recent years, minimum size limitations have been placed on the taking of many species of fish. Consequently, after a fish is caught, it is necessary to lift the fish out of the water to remove the hook and to measure the fish, to determine whether or not it must be released. Furthermore, in fishing tournaments, it is often the goal for the fisherman to see how many fish he can catch in a given period of time, which means when he catches a fish, he must remove the hook and return the fish to the water as quickly as possible. However, if a fish is not handled carefully during such lifting and hook removal operations, the mouth of the fish can be torn or otherwise damaged so that, even if the fish is released back into the water, it is unable to feed and, hence, is doomed to die. Consequently, both sportsmanship and ecology require that considerable care be taken in handling the fish. Unfortunately, fish are quite slippery and are difficult to handle under the best conditions. Moreover, since the hook has already punctured the skin of the fish, tearing out the skin during handling and hook removal is quite common. Furthermore, many fish are quite heavy and may struggle while being lifted out of the water, which makes handling the fish still more difficult. To overcome these problems, numerous prior art devices have been proposed for handling fish. Nets have been found to be of great assistance in lifting the fish out of the water. However, the nets do not prevent the fish from wriggling during measuring and hook removal and, hence, are of little value during these operations. Similarly, gaff hooks and the like have been used to assist in lifting the fish out of the water, but also do nothing to immobilize the fish during measuring and hook removal. In addition, numerous prior art devices have been proposed for insertion into the mouth of the fish to aid in gripping and immobilizing the fish during the measuring and hook removal operations. However, most of the prior art mouth insertion devices are formed of hard, rigid material which can easily cause, rather than prevent, damage to the mouth of the fish. Furthermore, most prior art mouth insertion devices require that, in holding the fish during hook removal, the user must hold his hand in a position which causes the fish's body to hang at an angle to its head which may cause damage and injury to the fish and which, due to the weight of the fish, causes considerable muscle strain to the user's wrists and arms.

BRIEF SUMMARY AND OBJECTS OF INVENTION

These disadvantages of the prior art are overcome with the present invention and an improved fish handling device is proposed which enables the fisherman to quickly and easily lift the fish from the water and provides a firm grip on the fish to allow the fisherman to firmly and securely immobilize the fish during lifting, measuring and hook removal operations without unnecessary strain on the fisherman's wrists and arms, yet which is safe and harmless for the fish.

The advantages of the present invention are preferably attained by providing an improved fish handling device comprising a generally U-shaped member having generally parallel upper and lower arms resiliently joined at one end and having cushioning means carried by the free ends of the arms, with the free ends inclining downward at a predetermined angle to the axis of the arms and having barrier means carried by the free ends adjacent their junction with the arms.

Accordingly, it is an object of the present invention to provide an improved fish handling device.

Another object of the present invention is to provide an improved fish handling device which will not injure or damage the fish.

An additional object of the present invention is to provide an improved fish handling device which is comfortable for the fisherman and does not cause unnecessary strain on his wrists and arms.

A further object of the present invention is to provide an improved fish handling device which enables the fisherman to quickly and easily lift the fish from the water.

Another object of the present invention is to provide an improved fish handling device which provides a firm grip on the fish to allow the fisherman to firmly and securely immobilize the fish during lifting, measuring and hook removal operations.

An additional object of the present invention is to provide an improved fish handling device which allows the fisherman to firmly and securely immobilize the fish during lifting, measuring and hook removal operations without unnecessary strain on either the fish or the fisherman's wrists and arms.

A further object of the present invention is to provide an improved fish handling device which is safe and harmless for the fish.

A specific object of the present invention is to provide an improved fish handling device comprising a generally U-shaped member having generally parallel upper and lower arms resiliently joined at one end and having cushioning means carried by the free ends of the arms, with the free ends inclining downward at a predetermined angle to the axis of the arms and having barrier means carried by the free ends adjacent their junction with the arms.

These and other objects and features of the present invention will be apparent from the following detailed description, taken with reference to the figures of the accompanying drawing.

BRIEF DESCRIPTION OF THE DRAWING

FIG. 1 is a side view of a fish handling device embodying the present invention;

FIG. 2 is a top view of the fish handling device of FIG. 1; and

FIG. 3 is a front view of the fish handling device of FIG. 1.

DETAILED DESCRIPTION OF THE INVENTION

In that form of the present invention chosen for purposes of illustration, FIG. 1 shows a fish handling device, indicated generally at 10, comprising a generally U-shaped member 12 formed of rigid, yet resilient material, such as plastic, which is hingedly joined at one end 14 and has upper and lower arms 16 and 18, respectively, projecting from the end 14 and extending generally parallel to each other. If desired, the lower arm 18 may be formed with ridges 20 to provide a more secure hand grip. Adjacent the free ends 22 and 24 of the upper arm 16 and lower arm 18, respectively, are depending portions 26 and 28, respectively, which extend downwardly at an angle of approximately 30° from the axes of the respective arms 16 and 18. As best seen in FIG. 1, the depending portions 26 and 28 are normally spaced apart. Cushioning members 30 and 32 enclose the depending portions 26 and 28, respectively, and are formed of suitable material, such as polyurethane foam, and have enlarged portions 34 and 36 provided on the facing surfaces thereof to protect the jaw of a fish against damage or injury. Finally, each of the arms 16 and 18 carries a flange, as seen at 38 and 40, which serves as a shield to prevent the depending portions 26 and 28 from being inserted too far into the mouth of a fish and to protect the fisherman's fingers from possibly being bitten by the fish. As best seen in FIG. 1, flange 38 projects upwardly from upper arm 16 adjacent the juncture of arm 16 with depending portion 26 and extends substantially perpendicularly to the arm 16. Flange 40 projects downwardly from depending portion 28 slightly before the juncture of depending portion 28 with lower arm 18 and extends at an angle of approximately 75° to the axis of depending portion 28.

In use, when the fish is hooked and brought along side the boat, the fisherman grasps the arms 16 and 18, inserts one of the depending portions 26 or 28, with cushioning means 30 and 32, into the mouth of the fish and squeezes the arms 16 and 18 toward each other, causing the depending portions 26 and 28 to clamp the jaw of the fish between them. The rigidity of the depending portions 26 and 28 assures a firm and secure grip, while the resiliency of the cushioning means 30 and 32 prevents damage or injury to the mouth of the fish. Flanges 38 and 40 serve to prevent the depending portions 26 and 28 from being inserted too far into the mouth of the fish and to prevent the possibility of the fish biting the user's fingers or of the user being snagged by a hook. Also, the angle of the depending portions 26 and 28 with respect to the arms 16 and 18 allows the fish to be held vertically, which prevents additional damage or injury to the fish, while allowing the fisherman's hand to be held in a position which is more comfortable and less strenuous for the fisherman. When the hook has been removed, fisherman can return the fish to the water and can release the fish by simply withdrawing the fish handling device 10 from the mouth of the fish.

Obviously, numerous variations and modifications can be made without departing from the spirit of the present invention. Accordingly, it should be clearly understood that the form of the present invention described above and shown in the figures of the accompanying drawing is illustrative only and is not intended to limit the scope of the present invention.

What is claimed is:

1. A fish lipping device comprising:

an upper arm and a lower arm each having a first end, said first ends resiliently joined to form a generally U-shaped member, each arm having a middle portion, said middle portions approximately parallel to one another, each arm having a free end portion extending away from said middle portion and forming a predetermined angle with said middle portion, a flange member affixed to each arm between said middle portion and said free end, and, a cushioning member mounted on each free end;

whereby, when a fish is hooked, a fisherman grasps said arms, inserts one of said free ends into the mouth of the fish, and squeezes said arms toward each other so as grasp the jaw of the fish, with the cushioning members preventing damage or injury to the fish.

2. The device of claim 1 wherein:

said cushioning means are formed of resilient material.

3. The device of claim 1 wherein:

one of said flange members projects upwardly from said upper arm and the other of said flange members projects downward from said lower arm.

4. The device of claim 1 wherein:

one of said flange members projects substantially perpendicularly upward from said upper arm.

5. The device of claim 1 wherein:

one of said flange members projects downward from said lower arm at an angle of approximately 75° to a longitudinal axis of said free end of said lower arm.

6. The device of claim 1 wherein:

said free ends form angles of approximately 30° with longitudinal axes of said middle portions of the respective arms.

7. The device of claim 1 wherein:

said cushioning members have enlarged portions formed on facing surfaces thereof.

\* \* \* \* \*